Patented Aug. 6, 1940

2,210,311

UNITED STATES PATENT OFFICE 2,210,311

PERFUMERY MIXTURE

Albert Weissenborn, Dessau in Anhalt, Germany, assignor to Winthrop Chemical Company, Inc., New York, N. Y., a corporation of New York No Drawing. Application January 15, 1940, Serial No. 313,971. In Germany December 9, 1938

4 Claims. (Cl. 167—94)

The present invention relates to perfumery mixtures.

U. S. Patent No. 2,169,984 relates to perfumery mixtures which are characterized by the fact that on preparing them there are simultaneously used ketals derived from pyrocatechol which contain in the ketone residue at least 6 aliphatically bound carbon atoms.

I have now found that the ketals which are produced from the homologues of pyrocatechol may likewise be used for the preparation of perfumery mixtures; in this case it is not necessary that in the ketone residue at least 6 carbon atoms are present. Whereas ketals derived from unsubstituted pyrocatechol and containing less than 5 carbon atoms are useless, since they possess too low a boiling point and have a hydrocarbon-like odor, for instance, the odor of toluene, the ketals prepared, for instance, from acetone and an alkyl pyrocatechol have a sufficiently high boiling point and constitute already distinctly valuable perfumery compounds. These bodies are obtained by causing alkyl substituted or cyclo-alkyl substituted pyrocatechols to react in known manner with ketone or by introducing into the nucleus of pyrocatechol ketals alkyl groups or cyclo-alkyl groups. These compounds may successfully be used as a substitute of natural amber in appropriate mixtures; furthermore, by altering the side chains and the ketone there may be prepared bodies having the most varied odors. Besides bodies of an amber-like odor compounds may, for instance, be obtained which have the odor of genuine opoponax or labdanum.

In the following table a series of bodies of that kind is enumerated by way of example:

Tertiary butyl - pyrocatechol - dimethyl - ketal boiling at 112° C. to 115° C. under a pressure of 4 to 5 mm.

Isohexyl-pyrocatechol-dimethyl-ketal boiling at 122° C. to 125° C. under a pressure of 4 mm.

Tertiary butyl-pyrocatechol-methylethyl-ketal boiling at 120° C. to 122° C. under a pressure of 4 mm.

Isohexyl-pyrocatechol-methylethyl-ketal boiling at 125° C. to 128° C. under a pressure of 4 mm.

Cyclopentyl-pyrocatechol-dimethyl-ketal boiling at 120° C. to 123° C. under a pressure of 4 to 5 mm.

Tertiary butyl-pyrocatechol-cyclotetramethylene-ketal boiling at 140° C. to 145° C. under a pressure of 4 mm.

Isopropyl-pyrocatechol-methylethyl-ketal boiling at 105° C. to 108° C. under a pressure of 4 to 5 mm.

The following examples serve to illustrate the invention, but they are not intended to limit it thereto; the parts being by weight:

Example I 400 parts of phosphorus pentoxide are introduced in the course of 4 to 6 hours into a mixture of 400 parts of tertiary butyl-pyrocatechol and 100 parts of acetone; 200 parts of acetone are simultaneously added drop by drop. On treating and washing the mixture with lye the non-transformed tertiary butyl-pyrocatechol is dissolved; it may be recovered from the solution. By a distillation of the crude oil there are obtained 250 to 300 parts of tertiary butyl-pyrocatechol-dimethyl-ketal boiling at 112° C. to 115° C. under a pressure of 4 to 5 mm.

Example II 5 parts of boron trifluoride are added to a mixture of 200 parts of pyrocatechol-dimethyl-ketal and 100 parts of isohexylene; the solution is allowed to stand for 24 hours or for some days. After the solution has been worked up there are obtained about 125 parts of isohexyl-pyrocatechol-dimethyl-ketal boiling at 122° C. to 125° C. under a pressure of 4 mm., besides recovered pyrocatechol-dimethyl-ketal (100 parts).

The condensation may likewise be performed with another condensing agent of a similar action.

Perfumery mixtures prepared while using the afore-named bodies are enumerated in the following examples:

Example 1.—Fougère-mixture

| | Parts |
|---|---|
| Linalyl acetate | 150 |
| Coumarin | 150 |
| Anisyl acetate | 65 |
| Lavender oil | 300 |
| Vetiver oil | 60 |
| Tarragon oil | 10 |
| Bergamot oil | 180 |
| East-Indian sandalwood oil | 40 |
| Benzyl acetate | 25 |
| Methyl ionone | 100 |
| Mousse de chêne (absol.) | 50 |
| Patchouli | 40 |
| Musk ketone | 50 |
| Geranium oil | 50 |
| Jasmin (absol.) | 20 |
| Salicylic acid isobutyl ester | 50 |
| Benzoe resinoid | 50 |
| Tertiary butyl-pyrocatechol-cyclotetra methylene ketal | 60 |
| | 1450 |

Example 2.—Russian leather perfume

| | Parts |
|---|---|
| East-Indian sandalwood oil | 180 |
| Bergamot oil | 200 |
| Vetiver oil | 50 |
| Geranium oil | 180 |
| Birch tar, rectified | 20 |
| Benzoic acid methyl ester | 20 |
| Salicylic acid methyl ester | 20 |
| Salicylic acid amyl ester | 80 |
| Coumarin | 70 |
| Musk ambrette | 70 |
| Linaloe oil | 80 |
| Cyclopentyl-pyrocatechol-dimethyl ketal | 30 |
| | 1000 |

Example 3.—Chypre (Cyprus)

| | Parts |
|---|---|
| Santalol | 60 |
| Coumarin | 20 |
| Musk ketone | 50 |
| Labdanum (absol.) | 25 |
| Tarragon oil | 30 |
| Sage oil | 30 |
| Vetiver oil | 60 |
| Linalool | 30 |
| Patchouli | 20 |
| Iso-eugenol | 35 |
| Methyl ionone | 50 |
| Mousse de chène (absol.) | 60 |

| | Parts |
|---|---|
| Bergamot oil | 270 |
| Jasmin (absol.) | 35 |
| Lavender oil | 10 |
| Heliotropin | 30 |
| Ylang-ylang | 70 |
| Benzoe resinoid | 75 |
| Isohexyl-pyrocatechol-dimethyl-ketal | 40 |
| | 1000 |

What I claim is:

1. Perfumes containing as a constituent a ketal derived from a pyrocatechol of the general formula

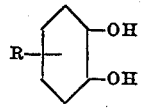

wherein R means a substituent of the group consisting of alkyl radicles and cycloalkyl radicles, and of a ketonic compound of the group consisting of aliphatic ketones and cycloalkanones.

2. Perfumes containing as a constituent tertiary butylpyrocatecholdimethylketal.

3. Perfumes containing as a constituent tertiary butylpyrocatecholmethylethylketal.

4. Perfumes containing as a constituent hexylpyrocatecholdimethylketal.

ALBERT WEISSENBORN.